Figure 1:
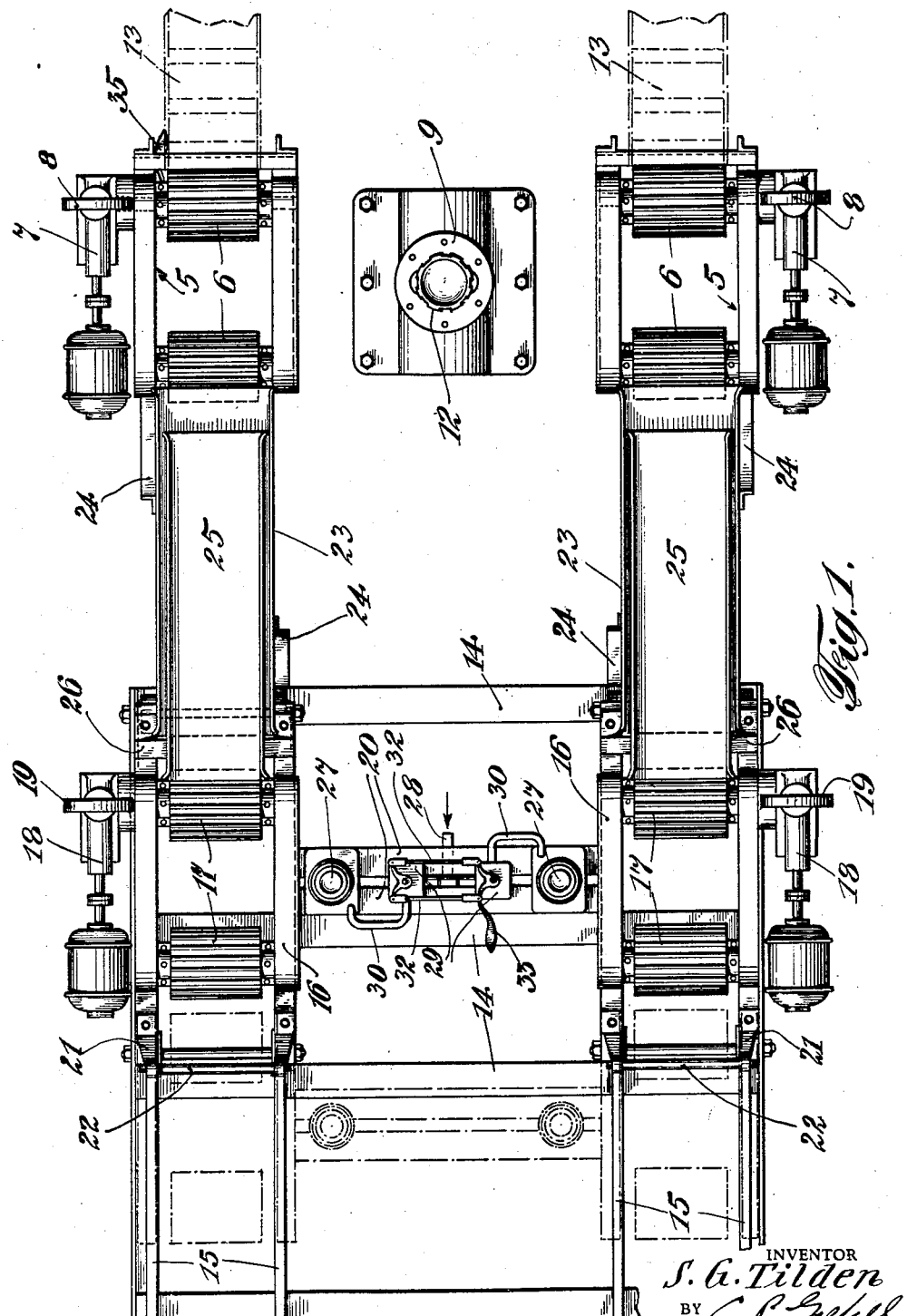

May 5, 1931. S. G. TILDEN 1,804,041
VEHICLE BRAKE ADJUSTING STAND
Filed March 27, 1928 4 Sheets-Sheet 1

INVENTOR
S. G. Tilden
BY
his ATTORNEY

May 5, 1931. S. G. TILDEN 1,804,041
VEHICLE BRAKE ADJUSTING STAND
Filed March 27, 1928 4 Sheets-Sheet 2

May 5, 1931.  S. G. TILDEN  1,804,041
VEHICLE BRAKE ADJUSTING STAND
Filed March 27, 1928   4 Sheets-Sheet 3

INVENTOR
S. G. Tilden
BY
his ATTORNEY

Patented May 5, 1931

1,804,041

UNITED STATES PATENT OFFICE

SYDNEY G. TILDEN, OF STEWART MANOR, NEW YORK

VEHICLE BRAKE ADJUSTING STAND

Application filed March 27, 1928. Serial No. 265,098.

This invention relates to vehicle brake adjusting stands, and has for its general object and purpose to provide a simply and durably constructed apparatus by means of which the testing and adjusting of the brakes of motor vehicle wheels will be facilitated.

It is a more particular object of the invention to provide a brake adjusting stand having front and rear sets of rollers with which the front and rear wheels of the vehicle are adapted to be engaged and means for mounting and supporting the front sets of rollers for movement as a unit whereby the apparatus will automatically adjust itself to receive and support vehicles having wheel bases of different lengths.

It is another object of the invention to provide a central stationary rear jack for lifting the rear end of the vehicle and a pair of front jacks together with means for mounting and supporting the latter jacks for bodily movement as a unit with the sets of front wheel receiving rollers.

It is also one of the detail objects of the invention to provide vehicle lifting jacks of the pneumatic type which may be easily and quickly operated to independently lift the front and rear ends of the vehicle from the supporting rollers, and means for manually operating the air supply valves for the front jacks so that the latter will be simultaneously actuated.

It is another object of the invention to provide an improved sectional track construction for the stand between the front and rear sets of wheel receiving rollers including movable track sections connected with the movable carriages of the front sets of wheel receiving rollers.

It is also an important object of the invention to provide a brake adjusting stand for motor vehicles which is of such construction as to permit of the entire freedom of movement of the mechanic beneath the vehicle in adjusting the brakes, and which will also occupy a minimum of floor space in the garage.

With the above and other objects in view, the invention consists in the improved brake adjusting stands for motor vehicles, and in the form, construction and relative arrangement of its several parts, as will be hereinafter more fully described, illustrated in the accompanying drawings, and subsequently incorporated in the subjoined claims.

In the drawings, wherein I have disclosed one simple and practical embodiment of the invention, and in which similar reference characters designate corresponding parts throughout the several views,—

Figure 2:
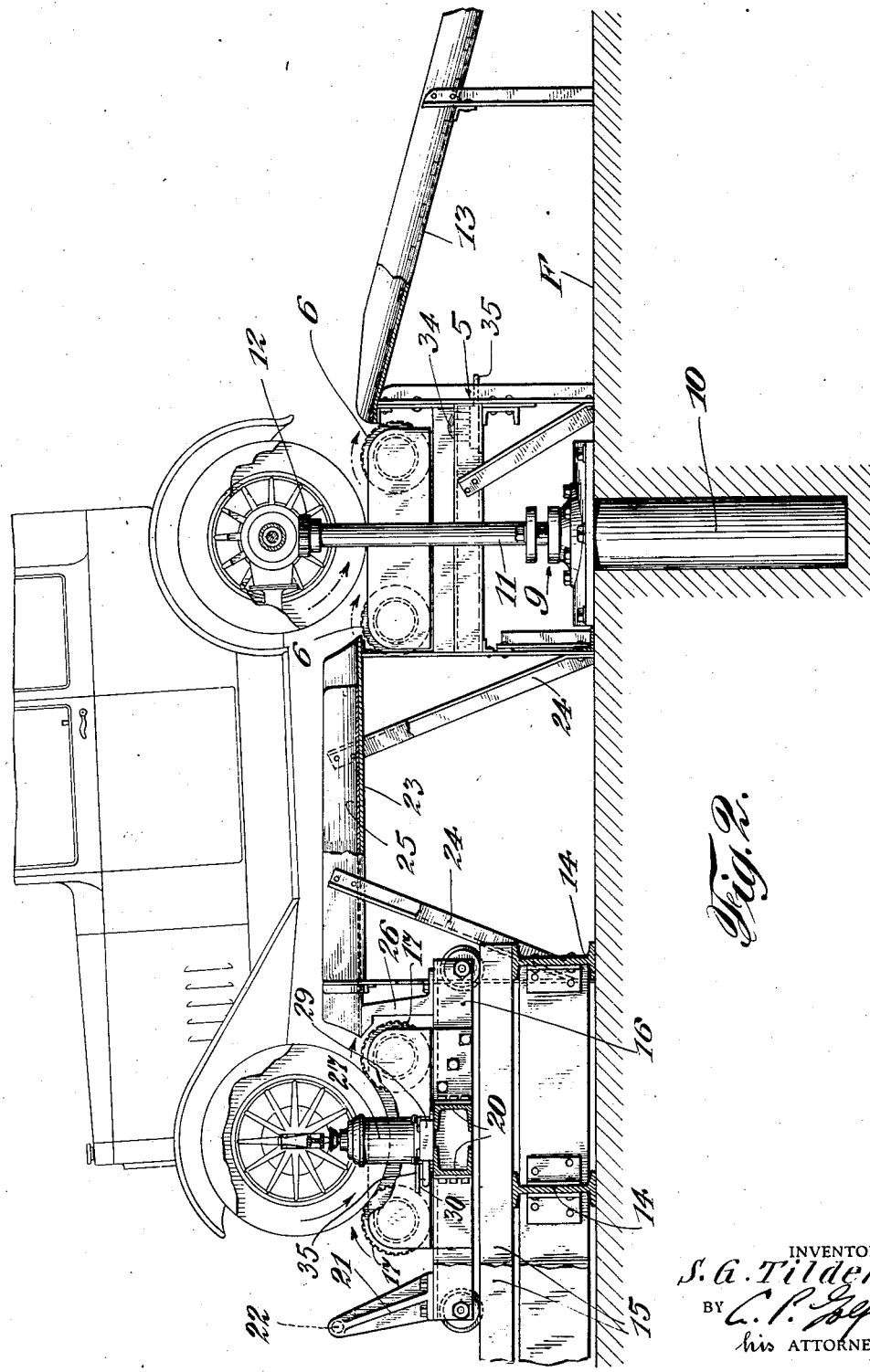
Figure 3:
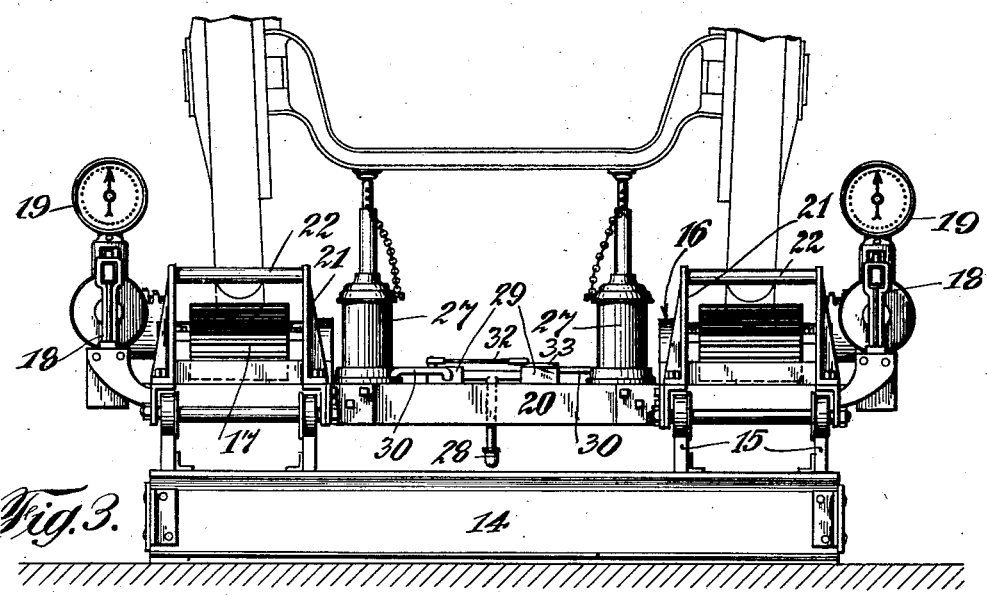
Figure 4:
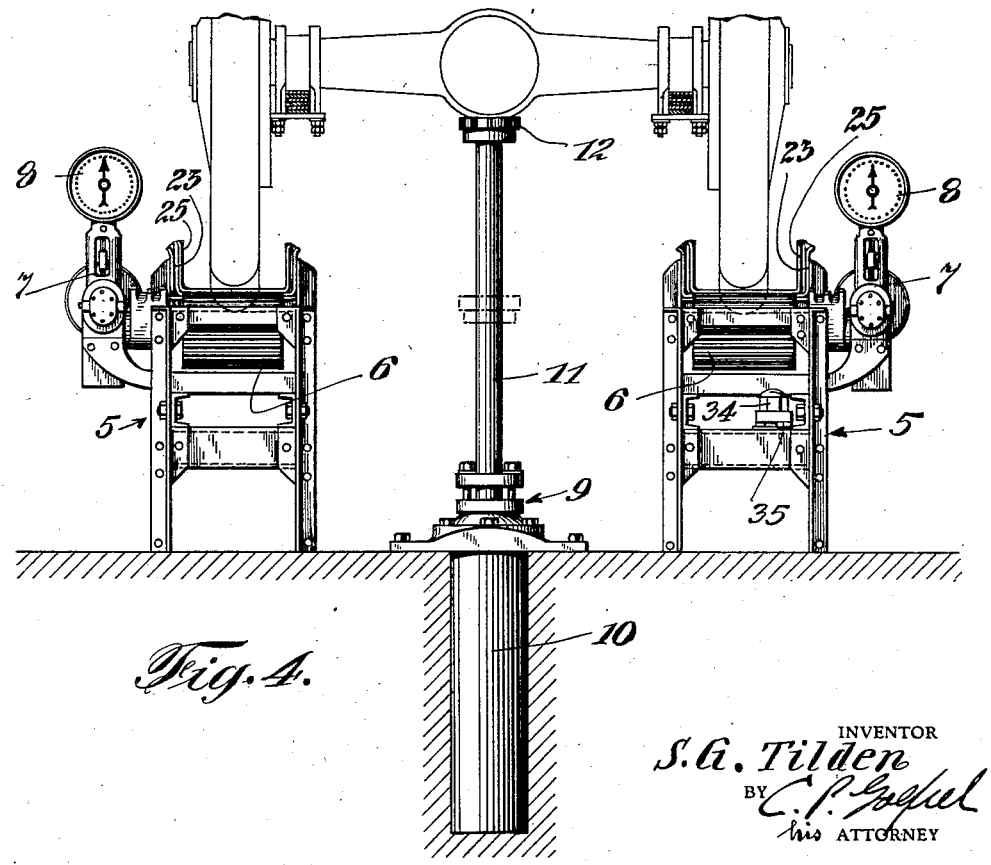
Figure 5:
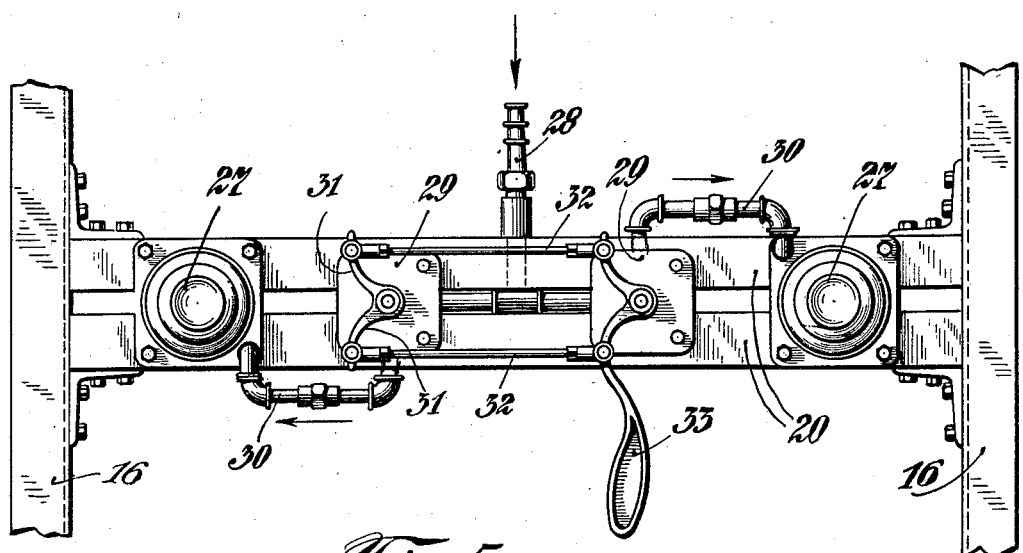
Figure 6:
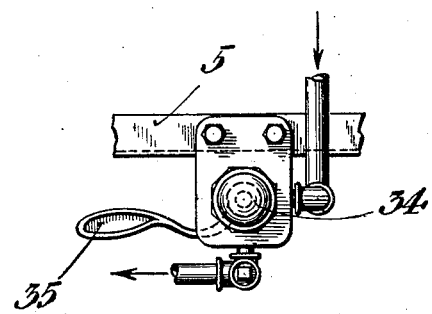

Figure 1 is a top plan view illustrating one practical embodiment of my present improvements;

Fig. 2 is a central longitudinal section;
Fig. 3 is a front end elevation;
Fig. 4 is a rear end elevation;
Fig. 5 is a top plan view on an enlarged scale illustrating the air valve control means for the front jacks, and
Fig. 6 is a detail plan view showing the air supply valve for the rear jack.

Referring in detail to the drawing, the improved brake adjusting stand includes the two rear frames generally indicated at 5 which are constructed of structural steel parts and are suitably anchored to the concrete or cement floor of the garage indicated at F. In the upper end of each of these frames 5, horizontally spaced rollers 6 are mounted, the transverse shafts of these rollers being journalled in suitable bearings on the opposite side members of the respective frames. Each of these rollers is provided upon its periphery with spaced longitudinal ribs to afford a proper traction surface for engagement by the tires of the vehicle wheels.

Upon the outer side of each of the frames 5, a testing machine generally indicated at 7, preferably of the dynamometer type is suitably mounted and has a driving connection with the shaft or axis of one of the rollers 6. This machine includes the usual gauge indicated at 8 calibrated in units indicative of the brake resistance pressure.

Between the two rear frames 5 and on the center line of the apparatus, a stationary jack 9 is arranged. This jack is preferably of the pneumatic type, and the cylinder 10 thereof extends below the surface of the floor F.

The jack plunger or piston 11 is provided on its upper end with the head 12 suitably formed for engagement with the under side of the differential case or housing of the motor vehicle.

In line with each pair of rollers 6, the approach ramps or wheel trackways 13 are suitably mounted and arranged, said trackways being inclined upwardly from the floor surface to the upper ends of the frames 5.

In horizontally spaced relation from the frames 5, a plurality of spaced transverse beams 14 are rigidly connected with each other and suitably anchored to the floor F. These beams at their opposite ends support the spaced track rails 15 upon which the horizontally traveling carriages 16 are mounted. Each of these carriages is provided with a set of rollers 17, similar to the rear sets of rollers 6, and upon the outer side of each carriage, the dynamometer testing machine 18 is mounted and connected with the axis of one of the rollers 17, each of said machines having a gauge 19.

The two carriages 16 are rigidly connected with each other by the transversely extending beams 20 so that said carriages move together as a unit upon the track rails 15. Each carriage at its forward end and at opposite sides thereof has upwardly extending bracket arms 21 in the upper ends of which a stop rod 22 is fixed, said rods obviating any possibility of the front vehicle wheels moving forwardly beyond the carriages.

Between the front and rear sets of rollers 6 and 17 and in line therewith, sectional trackways are arranged, each of said trackways including a fixed section 23 rigidly secured between the upper ends of the supporting bars 24. These trackway sections are provided with upwardly extending flanges at their opposite side edges and within each of said sections, a slidable track section 25 is arranged. The forward ends of these slidable track sections are fixedly secured to the bracket members 26 which are secured upon the rear ends of the respective carriages 16 of the front sets of rollers 17.

Upon the bridge beams 20 connecting the carriages 16 and adjacent to the respective carriages, pneumatically operated jacks 27 are mounted, the plunger heads of these jacks being adapted for engagement with the front wheel axle of the vehicle as clearly shown in Fig. 3 of the drawings. In order that these jacks shall be simultaneously operated to the same extent so as to keep the front end of the vehicle in proper balance as it is elevated, I provide the valve control means shown in Fig. 5 of the drawings, wherein compressed air is supplied from a convenient source through a flexible connection with the nipple 28 which is coupled through suitable pipe connections to the valve chambers shown at 29, the respective valve chambers being connected by the pipes indicated at 30 with the lower ends of the cylinders of the respective jacks 27. Any well known type of control valve may be provided in the chambers 29 for regulating a supply of air to the jack cylinders. The movable valve member has oppositely projecting arms 31 fixed thereto by suitable connections externally of the chambers 29, and the corresponding arms 31 are connected with each other by rods 32, the ends of said rods being pivotally connected with the respective arms. Rods 32 are adjustable for valve timing. One of the arms 31 is extended to form a suitable hand lever 33, and it will be evident that by moving this hand lever in the proper direction, the two valves will be rotated to the same degree, thus supplying air in equal volume to the cylinders of the jacks 27. While I prefer to use pneumatic jacks, it will be understood that hydraulic jacks, or hand operated jacks can be used at both the front and rear ends of the apparatus, if desired. The important feature in so far as the arrangement of these jacks is concerned, resides in the fact that the front pair of jacks are mounted and arranged for movement as a unit with the traveling carriages 16 for the front pairs of wheel receiving rollers 17.

In the use of the apparatus above described, the vehicle is driven upwardly upon the inclined approach ramps or trackways 13, the front wheels passing over the rear sets of rollers 6 and over the sectional trackways 23, 25 and moving off of the front ends of these trackways to a position upon the front sets of rollers 17, it being understood that the latter rollers are positioned at the rear ends of the supporting rails 15. If the wheel base of the vehicle is of such length that the rear wheels have not moved off of the approach ramps 13 and upon the rear rollers 6, under the continued application of driving power to the rear wheels, the front sets of rollers 17 and their carriages 16 will move forwardly upon the supporting rails 15, and until the rear wheels rest upon and between the rear rollers 6. In Fig. 2 of the drawings, I have shown a vehicle supported upon the stand which has a short wheel base. It will be evident however, that by the provision of the connected traveling carriages 16 for the front rollers 17, the apparatus will automatically accommodate itself to vehicles having wheel bases of much greater length.

Assuming that the vehicle has been driven to proper position upon the stand, and that the vehicle is equipped with four-wheel brakes, if it is desired to first adjust the rear wheel brakes, air is supplied to the cylinder 10 of the rear jack by the operation of lever 35 of the valve 34 shown in Fig. 6 of the drawings and which may be suitably mounted and arranged upon one of the rear frames 5. Thus the plunger 11 of this jack will be forced upwardly and the head 12 thereof engaged with the under side of the differential gear case to thereby lift the rear end of the vehicle and support the same with its rear wheels out of contact with the two sets of rear rollers 6 as shown in Fig. 2 of the drawings, thus facilitating adjustment of rear wheels. After the rear brakes have thus been adjusted, air is supplied to the cylinders of the two jacks 27 by operation of the two control valves by movement of the lever handle member 33 so as to elevate the front end of the vehicle and disengage the front wheels from the roller 17, and adjustment is made to the front wheels. When adjustment is completed, the jacks are lowered by releasing the air so as to lower the vehicle in position with the wheels on the sets of rollers 6 and 17. The brakes are then set and the testing machines 7 and 18 operated whereby the wheels will be rotated by one of the rollers in each set and the reading of the brake pressure resistance taken from the gauges 8 and 19. The proper adjustment of the brakes is then made and the test repeated until the gauges indicate the proper brake pressure resistance indicative of the efficient practical operation of the brakes. Of course, it will be evident that it is also possible when additional mechanics are available to simultaneously test all four of the vehicle wheels, each mechanic making the test and the necessary adjustments for the brake of one wheel.

From the foregoing description considered in connection with the accompanying drawings, the construction, and manner of use as well as the several advantages of my improved brake adjusting stand will be fully understood. By means of such an apparatus, it will be evident that the wheel brakes may be easily, quickly and accurately adjusted. The construction described affords a clear, unobstructed space beneath the body of the vehicle for the free movement of the mechanic in making the required adjustments. Therefore, the work may be accomplished with a relatively small amount of labor and in a minimum length of time and enables such adjustments to be made at a very reasonable charge to the vehicle owner. After the brake adjustments have been made, the vehicle may be backed from its position upon the stand downwardly over the ramps or trackways 13 to the floor surface of the garage. Heretofore, the mechanic was obliged to expend considerable time after the machine had been positioned upon the rollers of the testing devices, in positioning the jacks and raising the vehicle end, and particularly the jacks for the front end of the vehicle. By means of my invention wherein the front jacks are permanently mounted and positioned relative to the front sets of rollers 17 and move as a unit therewith, said jacks will always be located directly beneath the front vehicle axle regardless of the length of the wheel base and it is therefore, only necessary for the mechanic to operate the control valves to actuate said jacks and lift the vehicle from the testing rollers.

It will be noted that the brake adjusting stand consists of relatively few elements of simple forms which can be produced and assembled in the complete installation at comparatively small cost. I have herein shown and described an embodiment of my present improvements which has given highly satisfactory results in practice. Nevertheless, it is to be understood that the essential features of the invention might also be incorporated in various other alternative structural forms, and I accordingly reserve the privilege of resorting to all such legitimate changes in the form, construction and relative arrangement of the various elements as may be fairly incorporated within the spirit and scope of the invention as claimed.

I claim:

1. An adjusting stand for motor vehicle brakes including rear sets of rollers upon which the rear wheels of the vehicle are adapted to be positioned, front sets of rollers upon which the front vehicle wheels are adapted to be positioned, means for mounting said front sets of rollers for horizontal traveling movement as a unit with respect to the rear sets of rollers, a brake testing machine associated with each of said front and rear sets of rollers and having a driving connection with one of the rollers, a stationary lifting jack for the rear end of the vehicle centrally mounted between the rear sets of rollers, and a lifting jack for the front end of the machine supported upon said mounting for the front sets of rollers for bodily movement as a unit therewith.

2. In a motor vehicle brake adjusting stand, spaced rear sets of rollers upon which the rear wheels of the vehicle are adapted to be positioned, front sets of rollers upon which the front vehicle wheels are adapted to be positioned, a horizontally traveling carriage for each front set of rollers, bridge means rigidly connecting the spaced carriages with each other, and spaced lifting jacks mounted on said bridge means for movement as a unit with the carriages for lifting the front end of the vehicle above said rollers.

3. In a motor vehicle brake adjusting stand, rear supporting frames, spaced rollers journalled in each of said frames upon which the rear wheels of the vehicle are adapted to be positioned, approach trackways inclined upwardly to said rear sets of rollers, a brake testing machine mounted upon each of said frames and having a driving connection with one roller in each set, front sets of rollers to receive the front vehicle wheels, spaced traveling carriages in which the respective front roller sets are mounted, bridge means rigidly connecting said carriages with each other, wheel trackways extending between the corresponding front and rear roller sets, a brake testing machine on each of said carriages having driving connection with one of the front rollers, spaced lifting jacks to engage the front wheel axle mounted upon said bridge means for traveling movement as a unit with said carriages, and a stationary rear lifting jack centrally positioned between said rear sets of rollers.

4. In a motor vehicle brake adjusting stand, spaced rear sets of rollers upon which the rear wheels of the vehicle are adapted to be positioned, a brake testing machine associated with each of said sets of rollers, a lifting jack for the rear end of the machine arranged between said rear sets of rollers, front sets of rollers to receive the front vehicle wheels, a traveling carriage for each of said front sets of rollers, a pair of lifting jacks for the front end of the machine, supporting means for said lifting jacks connecting the carriages for traveling movement as a unit, and wheel trackways extending between said front and rear sets of rollers.

5. In a motor vehicle brake adjusting stand, spaced rear sets of rollers upon which the rear wheels of the vehicle are adapted to be positioned, a lifting jack for the rear end of the vehicle arranged between said roller sets, spaced front sets of rollers upon which the front vehicle wheels are adapted to be positioned, a horizontally traveling carriage for each front set of rollers, a bridge rigidly connecting said carriages with each other, a lifting jack for the front end of the machine mounted on said connecting bridge, extensible trackways arranged between corresponding front and rear sets of rollers, and a brake testing machine associated with each rear set of rollers.

6. In a motor vehicle brake adjusting stand, spaced rear sets of rollers upon which the rear wheels of the vehicle are adapted to be positioned, horizontally traveling supports to receive the front wheels of the vehicle and movable in the propulsion of the vehicle to position the rear wheels thereof upon said roller sets means rigidly connecting said supports with each other, and a lifting jack mounted on said connecting means and movable with said front wheel supports and located with respect thereto whereby the front wheel axle of the vehicle is automatically aligned with the lifting jack when the front vehicle wheels are positioned on said supports.

7. In a motor vehicle brake adjusting stand, spaced rear sets of rollers upon which the rear wheels of the vehicle are adapted to be positioned, a permanently located lifting jack between said roller sets for lifting the rear end of the vehicle, horizontally traveling supports to receive the front vehicle wheels movable in the propulsion of the vehicle to position the rear wheels thereof on said roller sets, jack supporting means rigidly connecting said front wheel supports with each other, and a jack mounted upon said supporting means and with which the front wheel axle is aligned when the vehicle wheels are positioned on said supports.

8. In a motor vehicle brake adjusting stand, spaced rear sets of rollers upon which the rear wheels of the vehicle are adapted to be positioned, horizontally traveling supports to receive the front wheels of the vehicle and movable in the propulsion of the vehicle to position the rear wheels thereof upon said roller sets means rigidly connecting said supports with each other, transversely spaced lifting jacks mounted on said connecting means and movable with said front wheel supports and located with respect thereto whereby the front wheel axle of the vehicle is automatically aligned with the lifting jacks when the front vehicle wheels are positioned on said supports, and a single manually operable control means simultaneously controlling the operation of said lifting jacks.

In testimony that I claim the foregoing as my invention, I have signed my name hereto.

SYDNEY G. TILDEN.